(12) United States Patent
Tsai (10) Patent No.: US 7,749,643 B2
(45) Date of Patent: Jul. 6, 2010

(54) PROTECTIVE BATTERY HOLDING STRUCTURE

(75) Inventor: Tsung-Cheng Tsai, Hsinchu County (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 1105 days.

(21) Appl. No.: 11/308,733

(22) Filed: Apr. 27, 2006

(65) Prior Publication Data

US 2007/0111087 A1    May 17, 2007

(30) Foreign Application Priority Data

Nov. 16, 2005  (TW) .............................. 94140354 A (51) Int. Cl.
*H01M 2/10*    (2006.01)
*H01M 2/00*    (2006.01)

(52) U.S. Cl. ........................ 429/100; 429/96; 429/163
(58) Field of Classification Search ................... None
See application file for complete search history.

(56) References Cited

U.S. PATENT DOCUMENTS 2,385,127 A * 9/1945 Carlile .................... 429/163
6,399,238 B1 * 6/2002 Oweis et al. ................ 429/99
6,743,546 B1 * 6/2004 Kaneda et al. ............. 429/127

FOREIGN PATENT DOCUMENTS

| JP | 04196050 A | * | 7/1992 |
| JP | 2000012045 A | * | 1/2000 |
| JP | 2000067823 A | * | 3/2000 |
| JP | 2005108481 A | * | 4/2005 |

* cited by examiner

*Primary Examiner*—Dah-Wei D Yuan
*Assistant Examiner*—Edu E Enin-Okut
(74) *Attorney, Agent, or Firm*—Pai Patent & Trademark Law Firm; Chao-chang David Pai (57) ABSTRACT

A protective battery holding structure includes a heat-resistant battery holder that defines a receiving space for receiving at least one battery therein and is provided with at least one rib protruded toward the receiving space to point-contact with an outer surface of the battery. The point contact of the battery with the ribs on the heat-resistant battery holder prevents heat produced by the battery during operation from transferring to and thereby damaging an outer case of the battery holder. The ribs also increase the structural strength of the battery holder and stably locate the battery in the battery holder.

8 Claims, 11 Drawing Sheets

PROTECTIVE BATTERY HOLDING STRUCTURE

RELATED APPLICATIONS

The present application is based on, and claims priority from, Taiwan Application Serial Number 94140354, filed Nov. 16, 2005, the disclosure of which is hereby incorporated by reference herein in its entirety.

FIELD OF THE INVENTION

The present invention relates to a battery holding structure, and more particularly, to a protective battery holding structure that effectively protects an outer case of a heat-resistant battery holder against damage caused by heat from the battery during operation being transferred to the outer case via the battery holder.

BACKGROUND OF THE INVENTION

Batteries are very popular and useful power sources for portable electronic products.

Every electronic product has circuitry specific for its application. The circuitry is provided on a circuit board, and the circuit board is mounted in a case separately or along with one or more batteries. The batteries supply power via the circuit board to electronic elements of the electronic product, so that the electronic product can operate normally.

Figure 1:
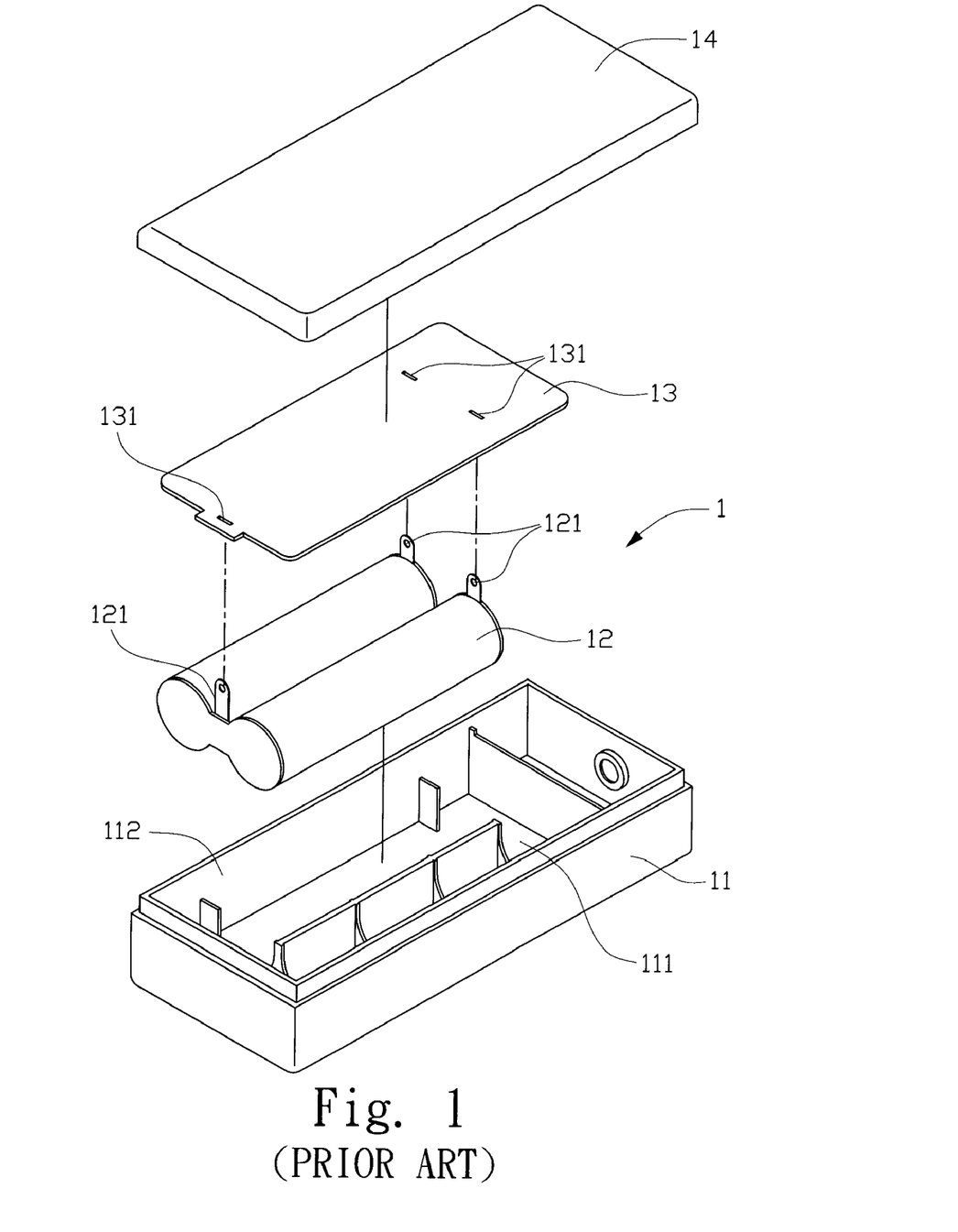
FIG. 1 is an exploded perspective view of a conventional battery holding structure.
Figure 2:
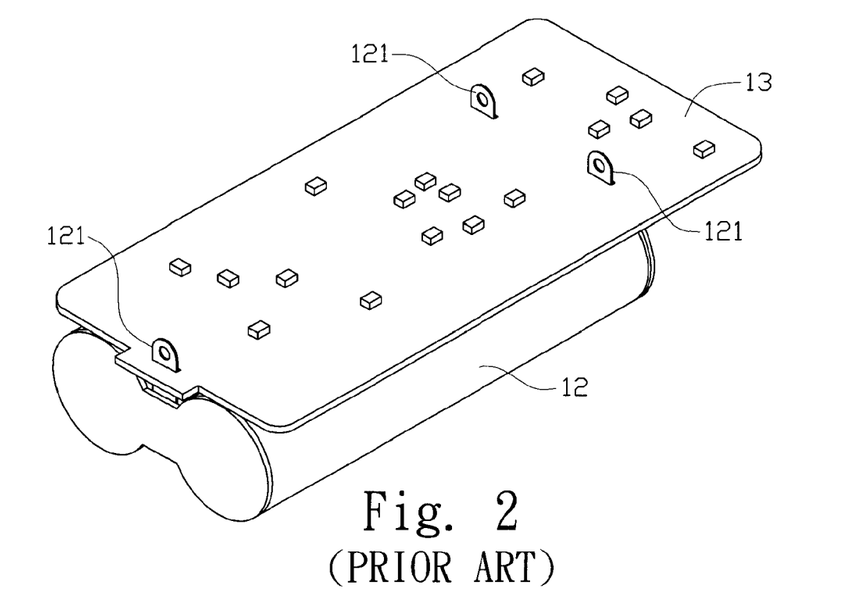
FIG. 2 is an assembled perspective view showing two batteries connected to a circuit board in the conventional battery holding structure of FIG. 1.
Figure 3:
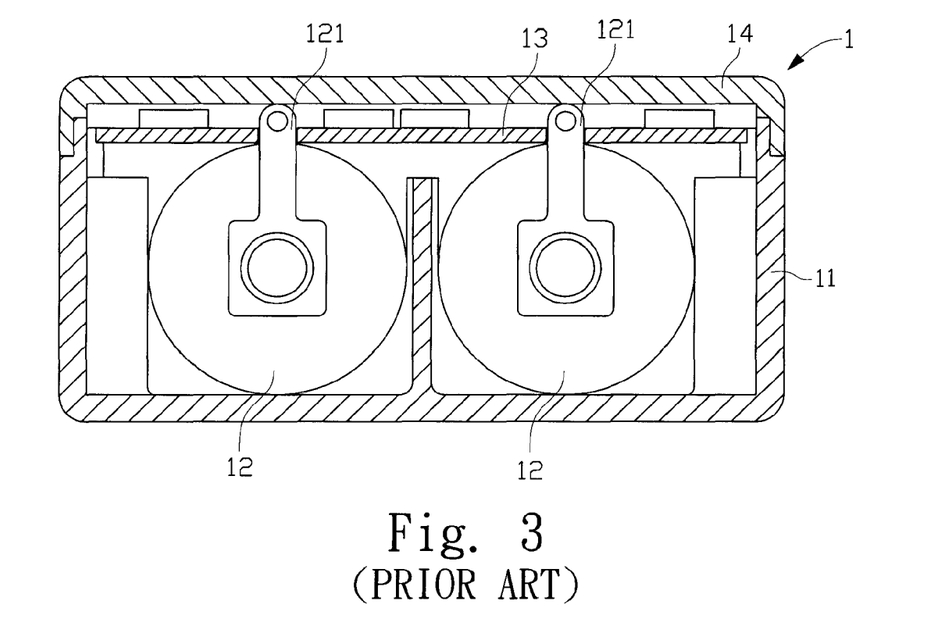
FIG. 3 is an assembled sectional view of the conventional battery holding structure of FIG. 1.

FIGS. 1 and 3 are an exploded perspective view and an assembled sectional view, respectively, of a conventional battery holding structure 1. As shown, the conventional battery holding structure 1 includes a case 11, at least one battery 12, a circuit board 13, and a case cover 14. The case 111 defines a receiving space 111 and has an open top 112. The battery 12 has at least one upward projected electrode tab 121, and the circuit board 13 is provided at positions corresponding to the electrode tabs 121 with through-holes 131, through which the electrode tabs 121 are extended to solder to the circuit board 13, so that the battery 12 is connected to the circuit board 13, as shown in FIG. 2.

The battery 12 connected to the circuit board 13 is then positioned in the receiving space 111 of the case 11. The case cover 14 closes the open top 112 to seal the case 11. In other words, the battery 12 and the circuit board 13 are received between the case 111 and the case cover 14.

Since the case 111 and the case cover 14 are externally visible and touchable, they are usually designed to be aesthetically and tactilely pleasing as well as electrically insulative. To meet these requirements, the case 111 and the case cover 14 are generally made of a plastic material.

However, when the battery 12 supplies power, it also produces heat and accordingly high temperature, particularly when it is used with a high-power electronic product, such as an electrically heated jacket.

In the conventional battery holding structure 1 illustrated in FIGS. 1 to 3, since the case 11 is in direct contact with the battery 12, heat produced by the battery 12 is quickly transferred to the case 1. However, since the plastic case 11 is not highly heat-resistant, it tends to become heated and even partially molten and damaged by the heat produced by the battery 12.

SUMMARY OF THE INVENTION

A primary object of the present invention is to provide a protective battery holding structure to prevent heat produced by a battery during operation thereof from damaging an outer case of a battery holder holding the battery.

To achieve the above and other objects, the protective battery holding structure according to an embodiment of the present invention includes a heat-resistant battery holder that defines a receiving space for receiving at least one battery therein and is provided with at least one rib protruded toward the receiving space to contact with an outer surface of the battery. The point contact of the battery with the ribs on the heat-resistant battery holder prevents heat produced by the battery during operation from transferring to and thereby damaging an outer case enclosing the battery holder. The ribs also increase the structural strength of the battery holder and stably locate the battery in the battery holder.

In another embodiment of the present invention, the protective battery holding structure includes an outer case, at least one heat-resistant battery holder, a circuit board, and a case cover. The heat-resistant battery holder defines a receiving space for receiving at least one battery therein and is provided with at least one rib protruded toward the receiving space to contact with an outer surface of the battery. The battery holder with the battery held therein is positioned in an internal space of the outer case with the circuit board connected to a top of the battery holder, and the case cover closes a top of the outer case to seal the same.

The point contact of the battery with the ribs on the heat-resistant battery holder prevents heat produced by the battery during operation from transferring to and thereby damaging the outer case enclosing the battery holder. The ribs also increase the structural strength of the battery holder and stably locate the battery in the battery holder.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 4:
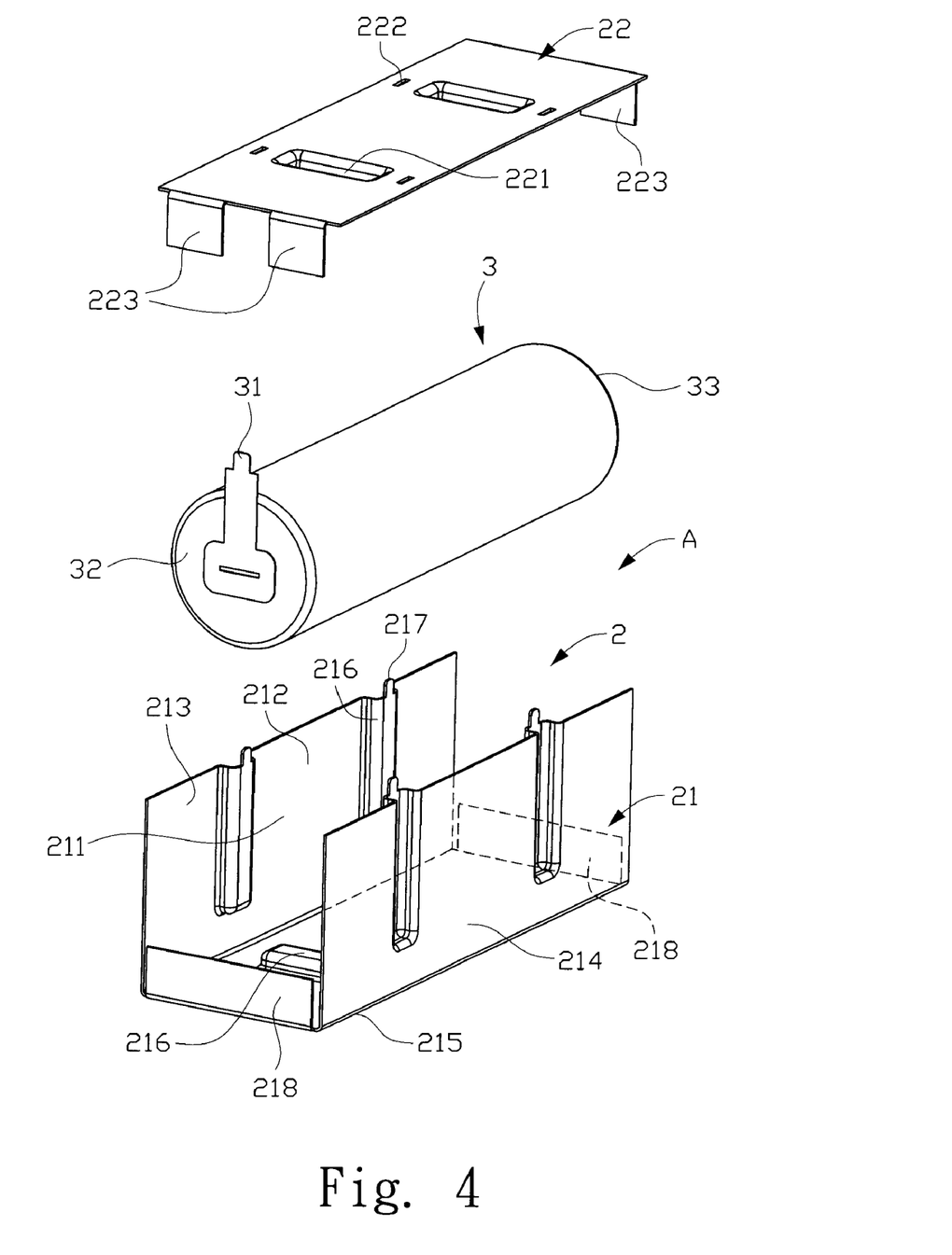
FIG. 4 is an exploded perspective view of a protective battery holding structure according to a first embodiment of the present invention.
Figure 5:
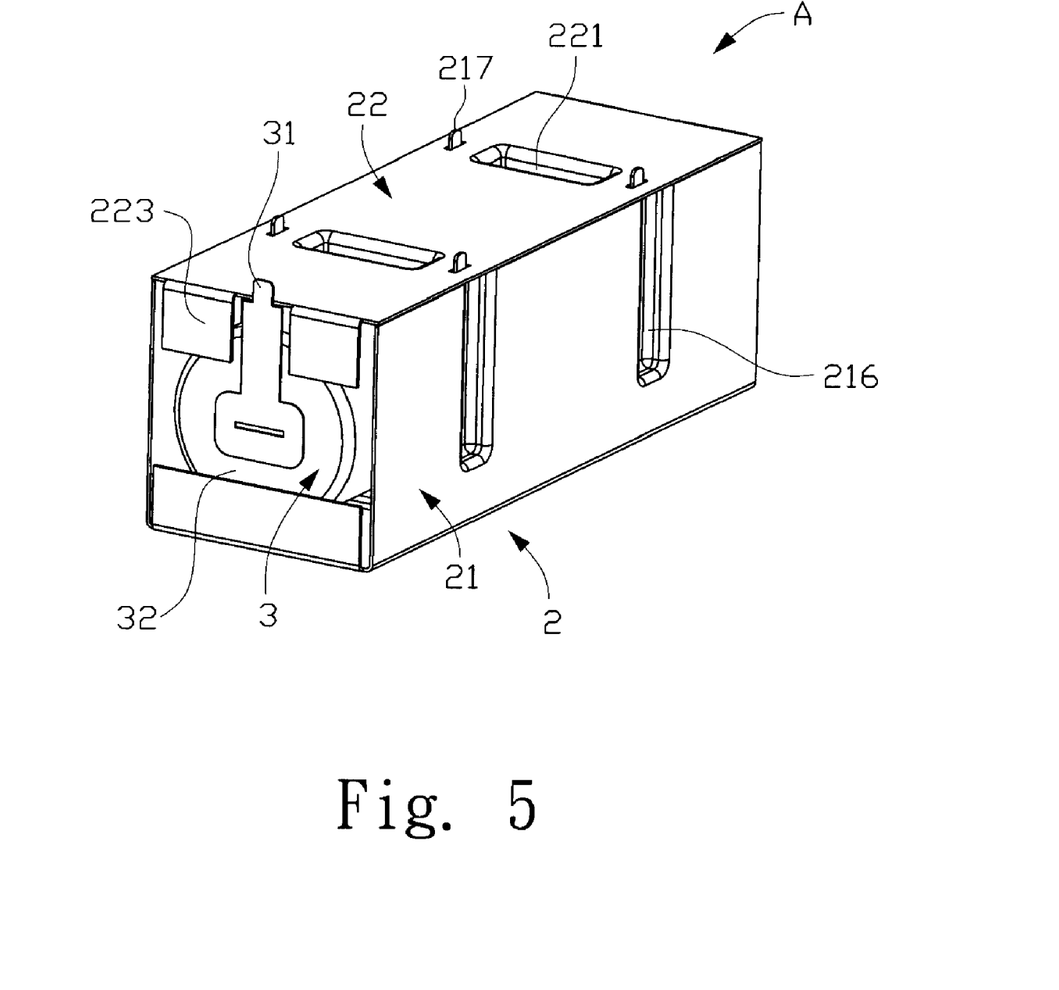
FIG. 5 is an assembled view of FIG. 4.
Figure 6:
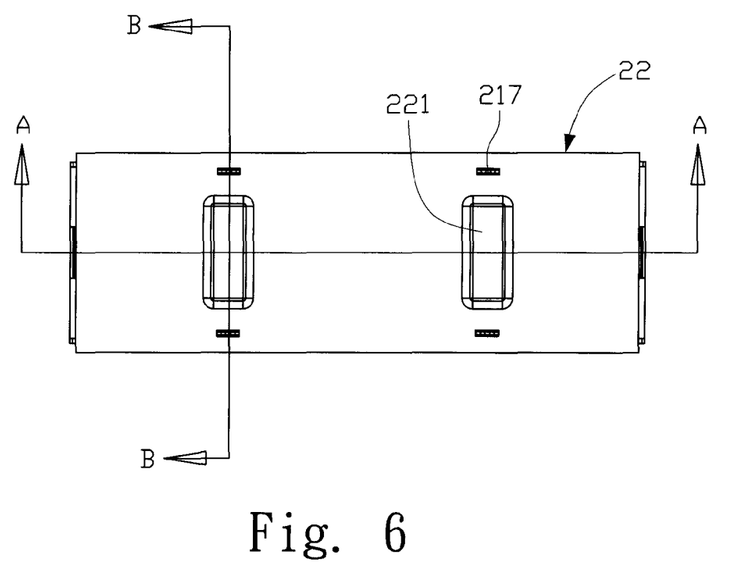
FIG. 6 is a top view of FIG. 5.
Figure 9:
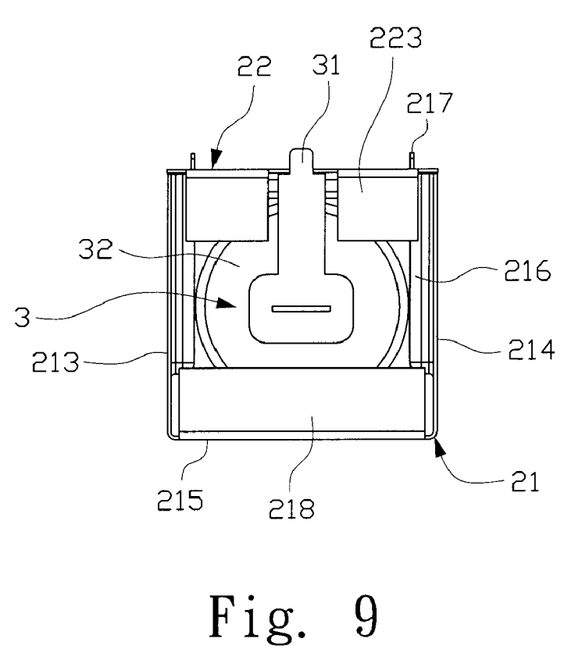
FIG. 9 is a front plan view of FIG. 5.

Reference is made to FIGS. 4 and 5, which are exploded and assembled perspective views, respectively, of a protective battery holding structure A according to a first embodiment of the present invention, and to FIGS. 6 and 9 that are assembled top and front plan views, respectively, of the protective battery holding structure A of FIG. 5.

As shown, the protective battery holding structure A includes a battery holder 2 for holding a battery 3 therein. The battery holder 2 is preferably made of a highly heat-resistant material, such as a metal material or a ceramic material. Alternatively, the battery holder 2 may have a ceramic coating. The battery holder 2 includes an open-topped seat 21 defining a receiving space 211 and a top opening 212, and a cover 22 closes the top opening 212 of the seat 21.

More specifically, the seat 21 includes a left wall 213, a right wall 214, and a bottom 215 to define the receiving space 211 therein.

The left wall 213, the right wall 214, and the bottom 215 of the seat 21 are provided with at least one rib 216 each, which protrude from the seat 21 toward the receiving space 211. The cover 22 is also provided with at least one rib 221 protruding from a lower side of the cover 22 toward the receiving space 211.

Figure 7:
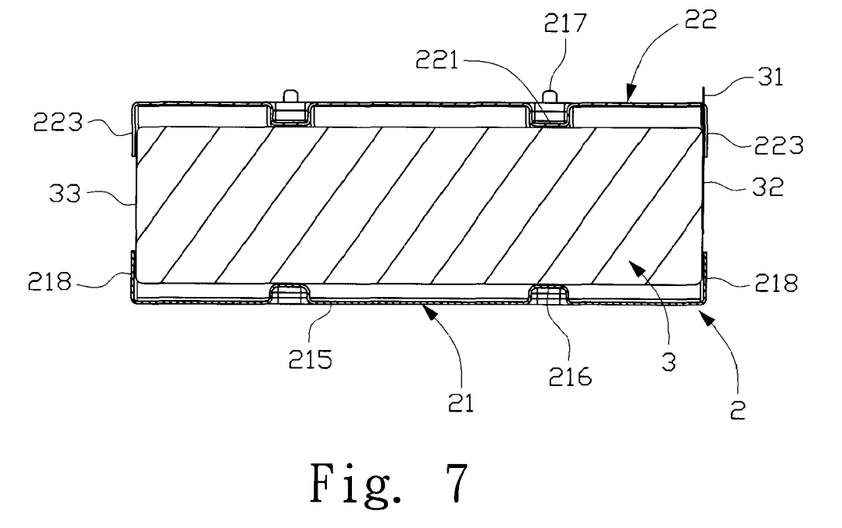
FIG. 7 is a sectional view taken along line A-A of FIG. 6.
Figure 8:
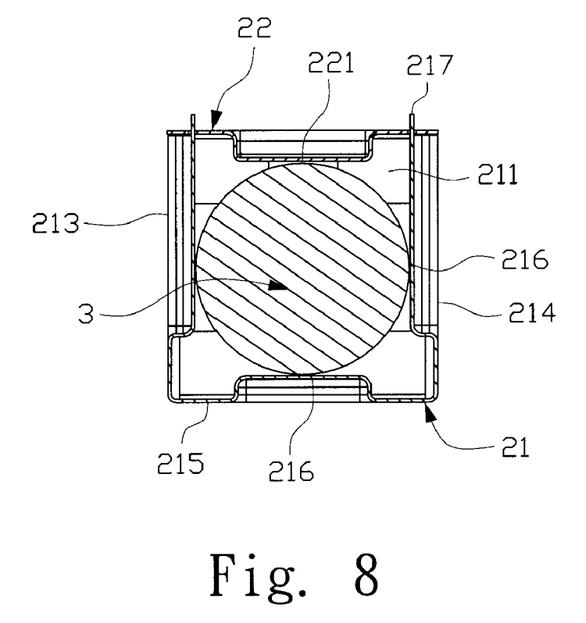
FIG. 8 is a sectional view taken along line B-B of FIG. 6.

Reference is made to FIGS. 7 and 8, which are sectional views taken along line A-A and line B-B of FIG. 6, respectively. The battery 3 is received in the receiving space 211 of the battery holder 2 with an outer surface of the battery 3 point-contacting with the ribs 216, 221. Therefore, the ribs 216, 221 not only increase a structural strength of the seat 21 and the cover 22, but also stably locate the battery 3 in the battery holder 2. Since the battery 3 is in point contact with the seat 21 and the cover 22 at the ribs 216, 221, heat produced by the battery 3 during power supply is transferred to the battery holder 2 at a lower rate.

The battery 3 is provided at an end, which is a front end 32 in the illustrated drawings, with an upward projected electrode tab 31 to serve as an electrically connecting element.

The seat 21 of the battery holder 2 is provided at predetermined positions with a plurality of upward projected first fixing tabs 217, and the cover 22 of the battery holder 2 is provided at positions corresponding to the first fixing tabs 217 with first through-holes 222, through which the first fixing tabs 217 are upwardly extended to connect the cover 22 to the seat 21.

The seat 21 is further provided at a lower front and a lower rear end with at least one dam 218 each, and the cover 22 is provided at a front and a rear end with at least one downward extended stopper 223 each. The dams 218 and the stoppers 223 abut on the front end 32 and the rear end 33 of the battery 3 to more stably locate the battery 3 in the receiving space 211 and prevent the battery 3 from bursting out forward or rearward of the battery holder 2 due to overly high internal pressure. That is, the dams 218 and the stoppers 223 function as a burst protection.

Since the battery holder 2 holding the battery 3 therein is made of a highly heat-resistant material, the battery holder 2 is adapted to bear the high temperature caused by the large amount of heat produced by the battery 3 during working and stop the heat from transmitting to an outer case (not shown) enclosing the battery holder 2, and thereby protects the outer case from damage due to the high temperature. In addition to enhancing the strength of the battery holder 2 and stably locating the battery 3 in place, the ribs 216, 223 provided on the seat 21 and the cover 22 of the battery holder 2 also reduce the heat transferred from the battery 3 to the battery holder 2.

Figure 10:
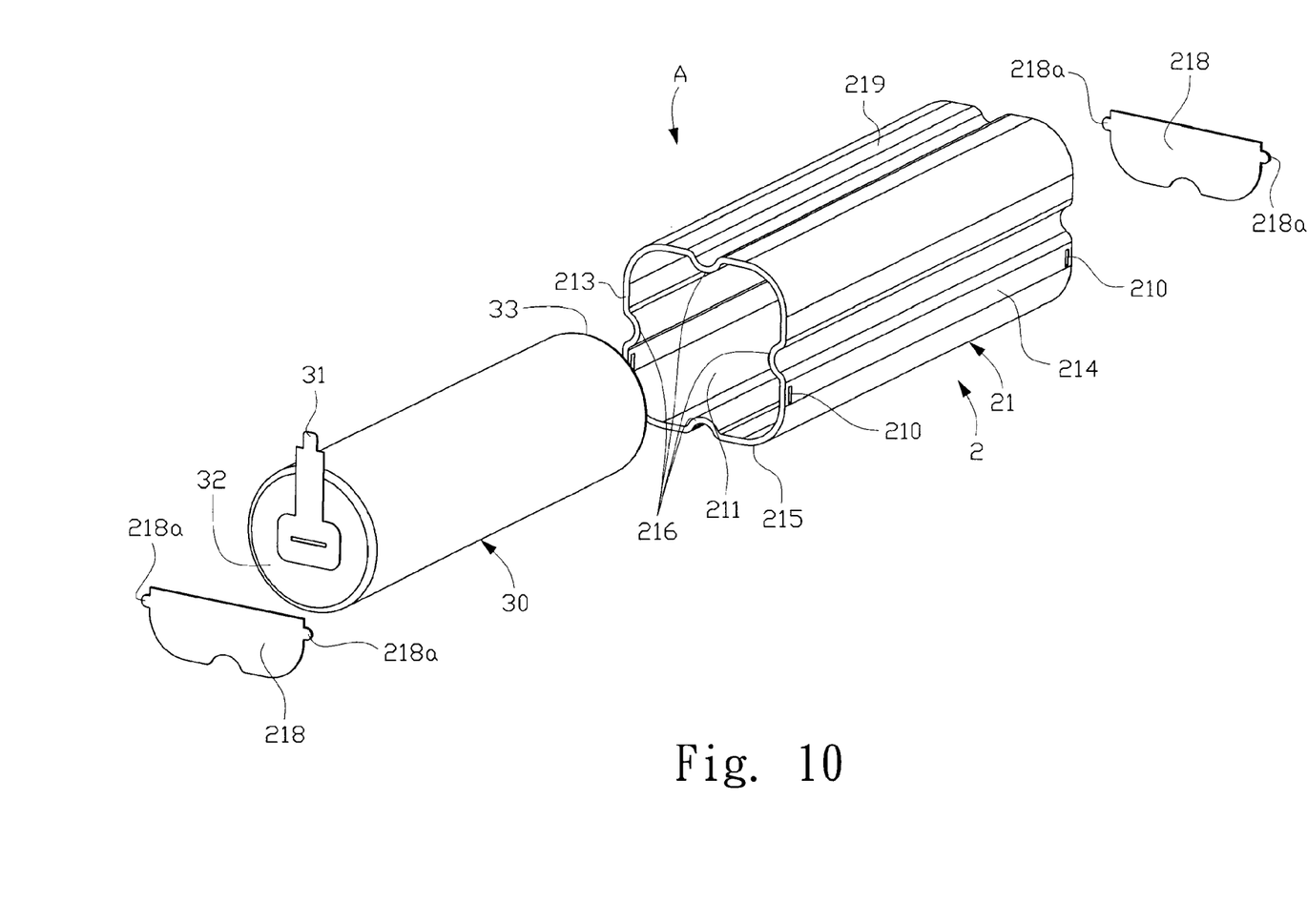
FIG. 10 is an exploded perspective view of a protective battery holding structure according to a second embodiment of the present invention.
Figure 11:
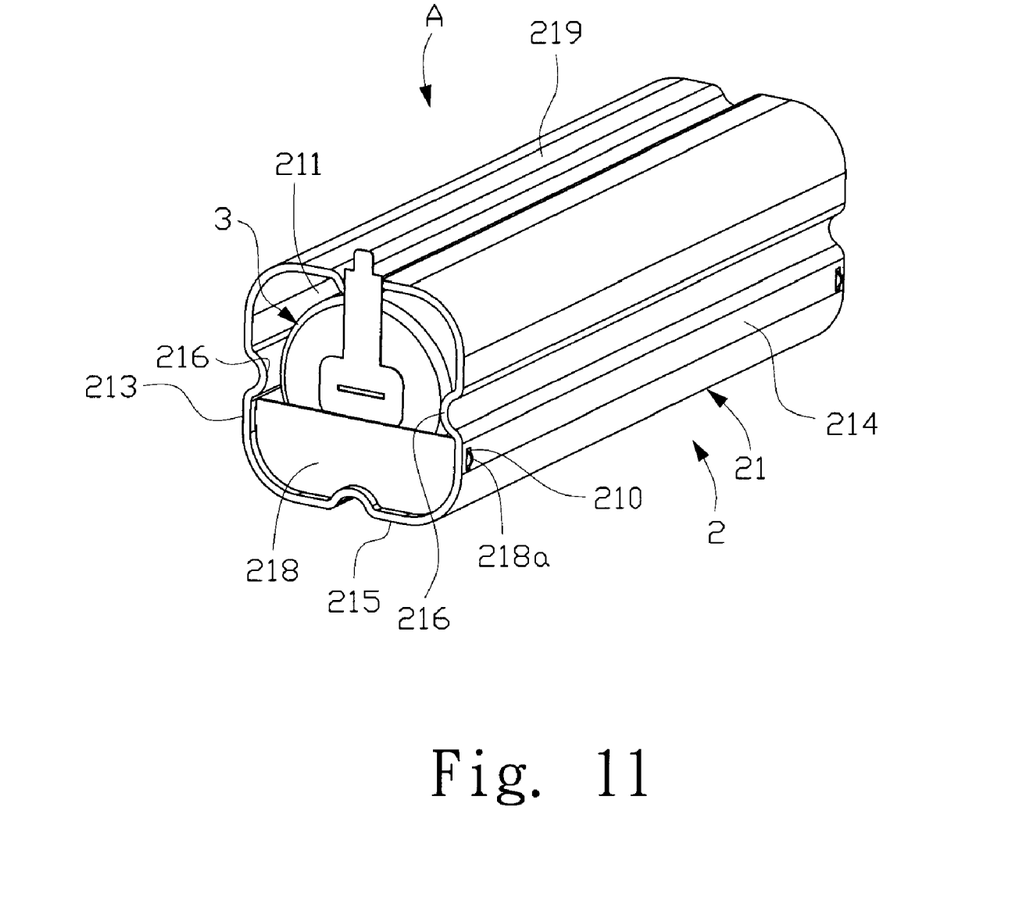
FIG. 11 is an assembled view of FIG. 10.

FIGS. 10 and 11 are exploded and assembled perspective views, respectively, of a protective battery holding structure A according to a second embodiment of the present invention. In the second embodiment of the present invention, the protective battery holding structure A includes a battery holder 2 that is a tubular seat 21 having integrally formed left wall 213, right wall 214, bottom 215, and top 219. The top 219 replaces the cover 22 of the battery holder 2 in the first embodiment. A receiving space 211 is defined in the integrally formed tubular seat 21 for receiving a battery 3 therein.

The left wall 213, the right wall 214, the bottom 215, and the top 219 of the tubular seat 21 are provided with at least one rib 216 each, which protrude from the seat 21 toward the receiving space 211 to contact an outer surface of the battery 3.

A dam 218 is connected to each one of the lower front and the lower rear end of the seat 21 to abut on a front and a rear end surface 32, 33 of the battery 3, so that the battery 3 is more stably located in the receiving space 211 of the seat 21, and is prevented from bursting out of the front or the rear end of the tubular seat 21 due to overly high internal pressure of the battery 3. That is, the dams 218 function like burst protection. More specifically, every dam 218 is provided at two lateral sides with a sideward projected second fixing tab 218a each, and the tubular seat 21 is correspondingly provided at the left and the right wall 213, 214 near the front and the rear end of the seat 21 with a second through-hole 210 each, through which the second fixing tabs 218a are extended to connect the dams 218 to two ends of the seat 21.

The protective battery holding structure A according to the second embodiment of the present invention provides the same performance as that of the first embodiment.

Figure 12:
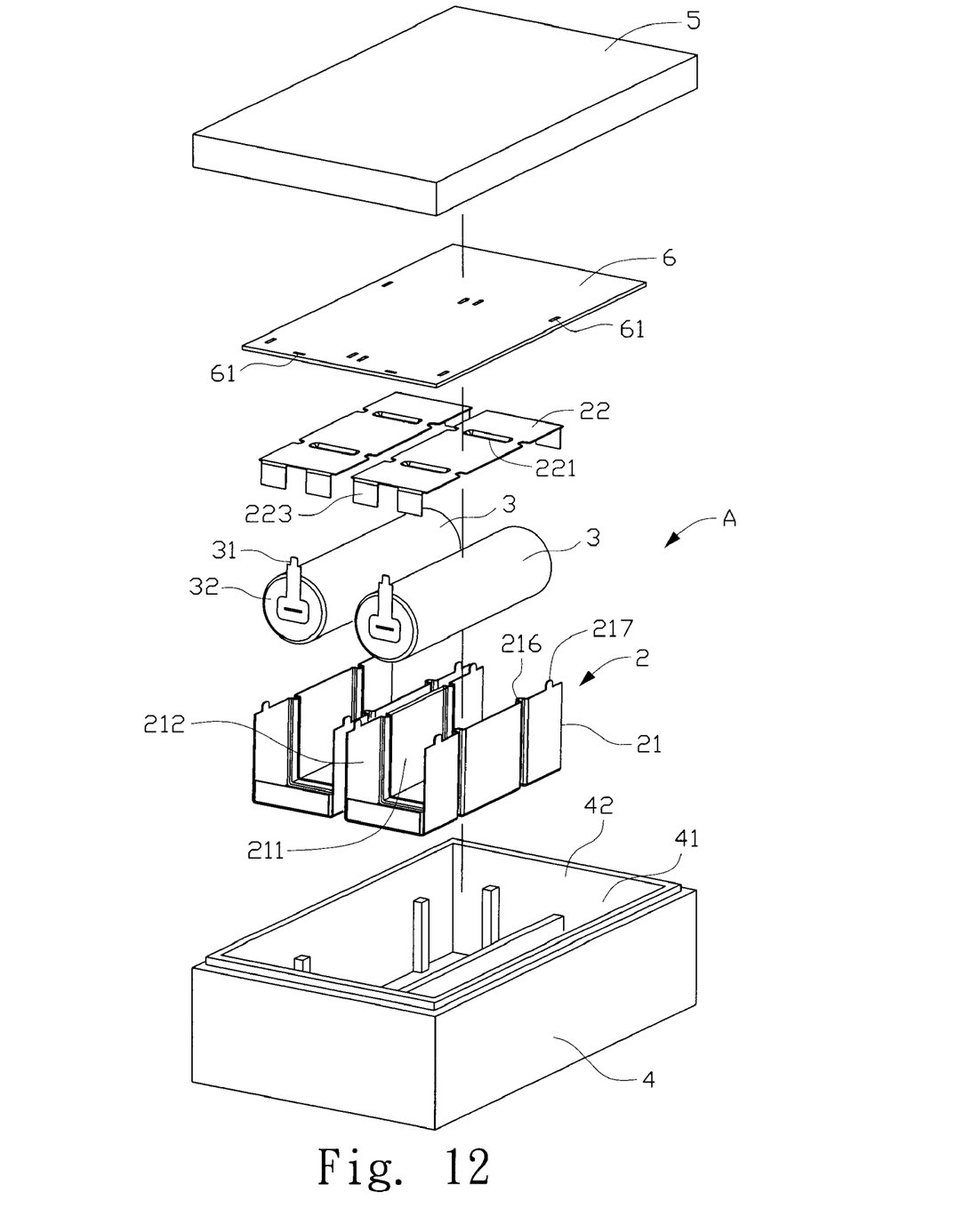
FIG. 12 is an exploded perspective view of a protective battery holding structure according to a third embodiment of the present invention.
Figure 13:
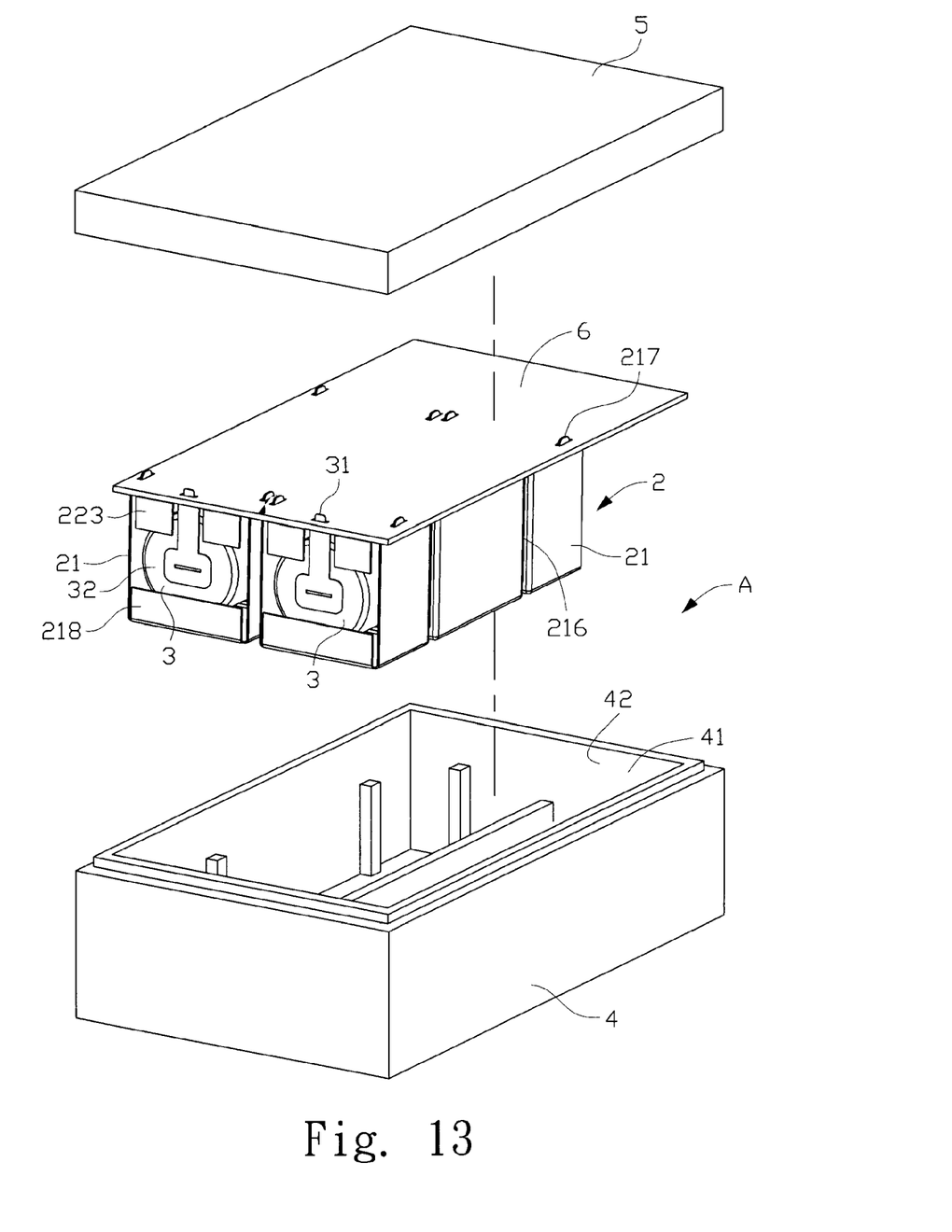
FIG. 13 is a partially assembled view of FIG. 12 with a circuit board assembled to a battery holder to enclose batteries therebetween.

FIGS. 12 and 13 are exploded and partially assembled perspective views, respectively, of a protective battery holding structure A according to a third embodiment of the present invention. The protective battery holding structure A of the third embodiment includes a battery holder 2, an outer case 4, a case cover 5, and a circuit board 6.

The outer case 4 defines an internal space 41 and a top opening 42. The case cover 5 fitly closes and thereby seals the top opening 42 of the outer case 4.

The battery holder 2 in the third embodiment is structurally similar to that in the first embodiment, and is therefore not described in detail. However, the battery holder 2 illustrated in FIGS. 12 and 13 is designed for holding two batteries 3 therein. The circuit board 6 is connected to a top of the assembled battery holder 2, as can be seen from FIG. 13. The circuit board 6 is provided at positions corresponding to the first fixing tabs 217 on the seat 21 of the battery holder 2 and the upwardly projecting electrode tabs 31 of the batteries 3 with third through-holes 61, through which the first fixing ribs 217 and the electrode tabs 31 are extended to solder to the circuit board 6, so that the circuit board 6 is connected to the top of the assembled battery holder 2.

The battery holder 2 with the batteries 3 received therein and the circuit board 6 soldered thereto is then positioned in the internal space 41 of the outer case 4 before the case cover 5 is closed over the top opening 42 of the outer case 4 to seal the latter.

Figure 14:
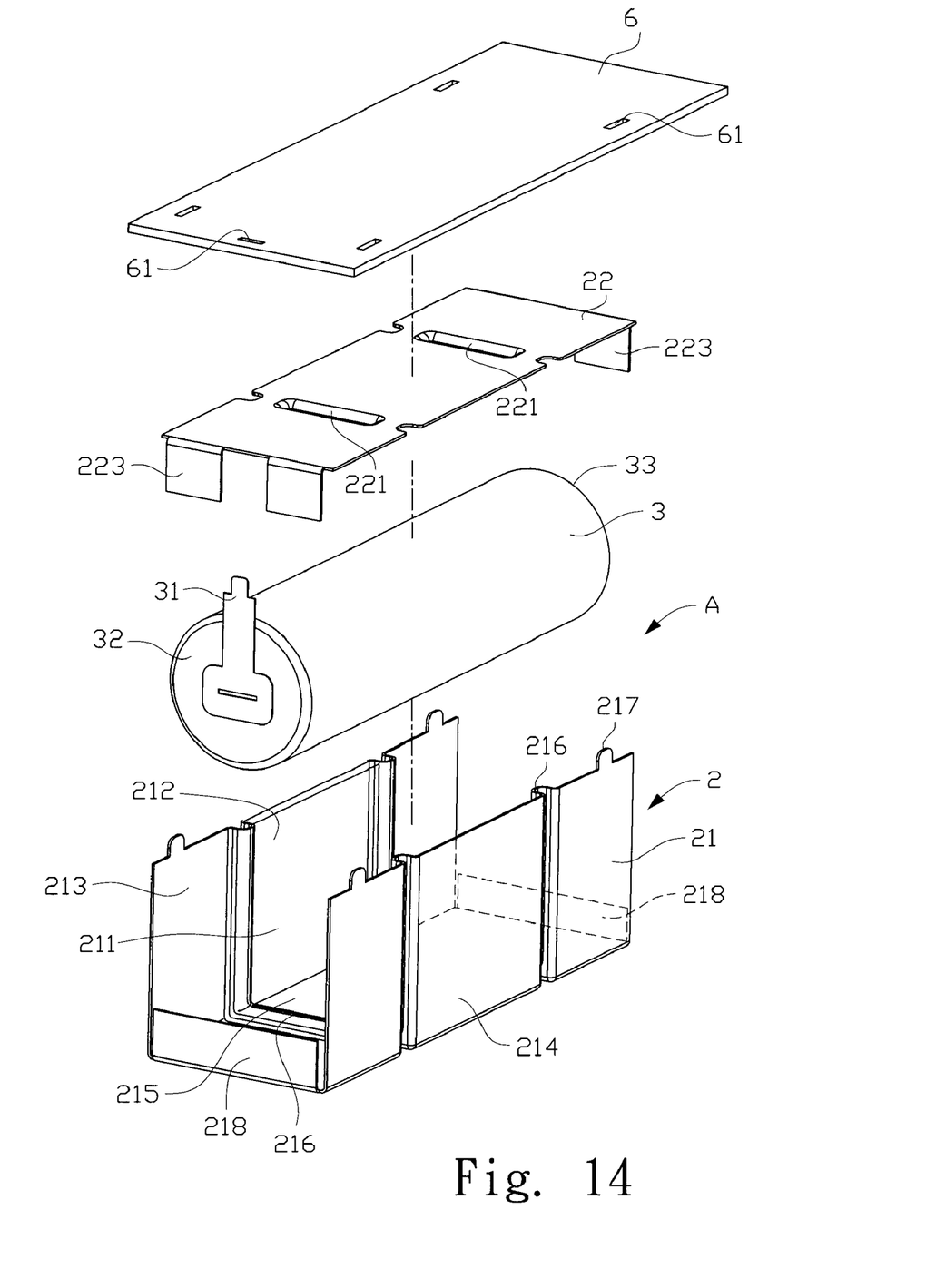
FIG. 14 is an exploded perspective view of a variant of the protective battery holding structure of FIG. 12 for holding only one battery in the battery holder, wherein an outer case of the protective battery holding structure is omitted from the drawing.

FIG. 14 is an exploded perspective view of a variant of the battery holder 2 in the third embodiment of the present invention. The battery holder 2 shown in FIG. 14 is structurally similar to that of FIG. 12, except that it defines a receiving space 211 for holding only one battery 3 therein.

In brief, the protective battery holding structure according to the present invention is characterized in a highly heat-resistant battery holder 2 that effectively bears and prevents the heat produced by the batteries 3 during operation from transferring to the outer case 4, and thereby protects the outer case 4 from damage due to high temperature.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A protective battery holding structure, comprising:
   an outer case defining an internal space having one open side;
   at least one battery holder for surrounding a single battery, and received in said internal space of said outer case, said battery holder made of a metal material, a ceramic material, or a material having a ceramic coating, and said battery holder defining a receiving space therein for holding the single battery, and provided at predetermined positions with ribs protruded from said battery holder toward said receiving space,
   wherein said ribs are in point contact with an outer surface of the single battery to secure the single battery and prevent heat produced by the single battery from damaging said outer case;
   a circuit board located in said internal space outside of said battery holder, and connected to said battery holder and the single battery received in said battery holder; and
   a case cover closing said open side of said outer case to thereby seal said outer case.

2. The protective battery holding structure as claimed in claim 1, wherein said open side of said internal space is provided at a top side of said outer case.

3. The protective battery holding structure as claimed in claim 1, wherein said battery holder includes a seat and a cover, said seat defining said receiving space, said receiving space having one open side, and said cover closing said open side of said receiving space and thereby sealing said seat.

4. The protective battery holding structure as claimed in claim 3, wherein said open side of said receiving space of said battery holder is a top side of said seat.

5. The protective battery holding structure as claimed in claim 4, wherein said seat of said battery holder includes a left wall, a right wall, and a bottom, and said receiving space is an internal space defined in said left wall, said right wall, and said bottom of said seat.

6. The protective battery holding structure as claimed in claim 5, wherein said left wall, said right wall, and said bottom of said seat, and a lower side of said cover are provided with at least one said rib each.

7. The protective battery holding structure as claimed in claim 4, wherein said seat is provided at predetermined positions with upwardly projected first fixing tabs, said battery is provided at an end with an upwardly projected electrode tab, and said circuit board is provided at positions corresponding to said first fixing tabs and said electrode tabs with third through-holes, through which said first fixing tabs and said electrode tabs are extended to weld to said circuit board.

8. The protective battery holding structure as claimed in claim 4, wherein said seat is provided at a lower front end and a lower rear end with at least one dam each, and said cover is provided at a front and a rear end with at least one downwardly extended stopper each, said dams and said stoppers being abutted on a front and a rear end surface of said battery held in said receiving space of said battery holder.

* * * * *